United States Patent Office 3,308,146
Patented Mar. 7, 1967

3,308,146
POLYSILYLMETHANES AND THEIR METHOD OF PREPARATION
Robert L. Merker, Pittsburgh, Pa., assignor to Dow Corning Corporation, Midland, Mich., a corporation of Michigan
No Drawing. Filed Dec. 3, 1962, Ser. No. 241,534
6 Claims. (Cl. 260—448.2)

This invention relates to new organosilicon compounds and to their method of preparation by an in situ Grignard process.

It is the object of this invention to provide novel organosilicon compositions which are useful as combustion regulators in hydrocarbon and other fuels and as intermediates in the preparation of other organosilicon compounds. Other objects and advantages will be apparent from the following description.

In accordance with this invention one adds a compound of the group $D_aBr_bCCl_{4-b-a}$ and $Ph_xCX_{4-x}$ in which D is methyl or hydrogen, $b$ is 1 to 4 inclusive, $a$ is 0 to 1 inclusive and $x$ is 1 or 2 and X is halogen having an atomic weight above 19, to a mixture of magnesium and a silane of the formula $Me_2RSiCl$ in which R is of the group methyl, hydrogen or OR', where R' is a lower alkyl radical, in a solvent comprising tetrahydrofuran in amount such that there is at least one mol of silane per gram atom of magnesium whereby a compound of the formula $[Me_2RSi]_nCY_{4-n}$, in which Y is of the group phenyl, methyl or hydrogen, $n$ is 2 to 4 and R is as above defined, is obtained.

In order to obtain the compositions of this invention it is essential that the bromomethane or phenylmethane be added to a mixture of the silane and magnesium in a solvent comprising tetrahydrofuran. The temperature of the reaction is not critical although it is preferred to operate in the range of from 55 to 70° C. The term "comprising tetrahydrofuran" means that a substantial portion of the solvent is this material but that other solvents can be present such as diethylether, toluene, xylene, dibutylether and the like.

It will be noted that the products obtained can contain more hydrogen than either of the starting materials. It is believed that this is a result of side reactions involving the tetrahydrofuran and can be illustrated, for example, by the following reactions:

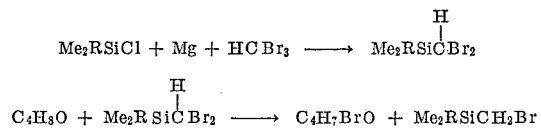

The latter product can then react with more magnesium and silane to produce $(Me_2RSi)_2CH_2$. It should be understood, of course, that other mechanisms may be responsible for the increase in the number of hydrogen atoms in the product over the starting matreial.

This invention also relates to novel compositions of the formula $[Me_2RSi]_nCR''_{4-n}$ in which $n$ is an integer from 2 to 4 inclusive, R is methyl, hydrogen or OR', where R' is an alkyl radical of 1 to 3 carbon atoms and R" is of the group methyl, phenyl and hydrogen, no more than one R" group per molecule being hydrogen.

When R is an alkoxy group, the compounds can also be prepared by reacting $(Me_2HSi)_nCR''_{4-n}$ with absolute methanol, ethanol, propanol or isopropanol or mixtures of these alcohols. It is best to use a catalyst such as chloroplatinic acid.

In the specification and claims the following abbreviations are used, Me for methyl and Ph for phenyl.

The following examples are illustrative only and should not be construed as limiting the invention which is properly delineated in the appended claims.

Example 1

In a dried container was placed 57.6 g. of magnesium, 258 g. of trimethylchlorosilane and 1,000 ml. of tetrahydrofuran. The mixture was then heated to reflux and the external heat was removed and 200 g. of bromoform in 200 ml. of tetrahydrofuran was then added at a rate to maintain reflux. The bromoform was added over a period of 2.5 hours and the product was then heated 1½ hrs. at reflux temperature. The reaction mixture was poured over crushed ice. The unreacted magnesium was removed and the solvent was removed at atmospheric pressure and the residue distilled to obtain tris(trimethylsilyl)methane boiling at 101° C. at 20 mm.

Example 2

Following the general procedure of Example 1, 41.1 g. of magnesium, 183.2 g. of trimethylchlorosilane and 420 ml. of tetrahydrofuran were placed in a container and a solution of 100 g. of benzotrichloride in 140 ml. of tetrahydrofuran was added through a dropping funnel. 50 g. of additional trimethylchlorosilane was added and the mixture was refluxed for one hour and poured over crushed ice. The magnesium was removed and the filtrate neutralized with sodium bicarbonate and the organic layer was washed with water, dried over sodium sulfate, and the solvents were removed by distillation. 200 ml. of methanol was added and the solution chilled to the temperature of a Dry Ice-acetone mixture. The precipitate was removed and recrystallized from 200 ml. of a 75 methanol–25 ethanol solution to give tris(trimethylsilyl)phenylmethane, melting at 158 to 160° C. The filtrate was then distilled at reduced pressure to give bis(trimethylsilyl)phenylmethane, boiling at 166° C. at 99 mm.

Example 3

Following the procedure of Example 1, 20.5 g. of magnesium, 91.6 g. of trimethylchlorosilane and 210 ml. of tetrahydrofuran were mixed and there was added thereto a solution of 100 g. of diphenyldichloromethane and 70 ml. of tetrahydrofuran. The mixture was refluxed 2 hours with additional 25 g. of trimethylchlorosilane. The product was poured over ice and cleaned up as shown above. After removal of the solvent, 200 ml. ethanol was added and tetraphenylethylene precipitated. This material was filtered off and the filtrate was fractionated at reduced pressure to give bis(trimethylsilyl)diphenylmethane which upon recrystallization from absolute ethanol melted at 103° C.

Example 4

Following the procedure of Example 1, 54.7 g. of magnesium, 22.4 g. of trimethylchlorosilane was reacted with 100 g. of 1,1,1-trichloroethane in 93 ml. of tetrahydrofuran. The solvent was removed and the residue was cooled in a bath of ice water whereupon tris(trimethylsilyl)methylmethane was obtained. The compound was recrystallized from absolute ethanol and had a melting point of 115° C.

Example 5

Following the procedure of Example 1, 58.8 g. of magnesium, 262 g. of trimethylchlorosilane and 600 ml. of tetrahydrofuran were mixed and there was added thereto 200 g. of carbontetrabromide in 200 ml. of tetrahydrofuran. The solvent and hexamethyldisiloxane were removed and from the crude products a precipitate was obtained. The residue was then fractionally distilled and more precipitate formed. This was combined with the first precipitate and crude products were recrystallized from absolute ethanol to give tetrakis(trimethylsilyl)methane which sublimes at below the melting point.

Example 6

Following the procedure of Example 1, 56.8 g. (2.33 g. atom) of magnesium, 276 g. (2.92 m.) of dimethylchlorosilane and 600 ml. of tetrahydrofuran was mixed and there was added thereto 200 g. of carbontetrabromide in 200 ml. of tetrahydrofuran. After addition, the product was refluxed for 5 hours. The reaction mixture was poured over crushed ice and purified as above in 500 ml. of methanol was added to the crude product and the solution was chilled in a dry ice acetone bath. A precipitate formed which was filtered off and recrystallized from a mixture of 95 percent methanol and 5 percent ethanol. The product was tetrakis(dimethylsilyl)methane melting at 115° C.

Example 7

A mixture of 20 g. of tetrakis(dimethylsilyl)methane, 100 ml. of absolute methanol and 10 drops of a 0.1 M solution of chloroplatinic acid catalyst in n-propyl alcohol were refluxed for nineteen hours. During this time an additional 25 drops of chloroplatinic acid solution was added. The theoretical volume of hydrogen was removed. The mixture was cooled and the precipitate was recrystallized from absolute methanol to give tetrakis(dimethylmethoxysilyl)methane which sublimes rather than melts.

Example 8

Employing the procedure of Example 7, 13.3 g. of $(Me_2HSi)_4C$ was reacted with 56 ml. of absolute ethanol in the presence of 9 drops of the catalyst. The product was recrystallized from absolute ethanol and there was obtained tetrakis(dimethylethoxysilyl)methane, melting point 114 to 115° C.

That which is claimed is:

1. A method comprising adding a compound selected from the group consisting of $D_aBr_bCCl_{4-b-a}$ and $Ph_xCX_{4-x}$, in which D is selected from the group consisting of methyl and hydrogen, b is an integer from 1 to 4 inclusive, a is 0 to 1 inclusive, x is 1 to 2 inclusive and X is a halogen having an atomic weight above 19, to a mixture of magnesium and a silane of the formula $Me_2RSiCl$ in which R is selected from the group consisting of methyl, hydrogen and OR' radicals where R' is an alkyl radical of 1 to 3 carbon atoms in a solvent comprising tetrahydrofuran in amount such that there is at least 1 mol of silane per gram atom of magnesium whereby there is obtained a compound of the formula $$[Me_2RSi]_nCY_{4-n}$$

in which $n$ is from 2 to 4 inclusive, when $n$ is 2, Y is selected from the group consisting of phenyl and hydrogen, when $n$ is 3, Y is selected from the group consisting of phenyl, methyl and hydrogen and R is as above defined.

2. A compound of the formula $[Me_2RSi]_nCR''_{4-n}$, in which $n$ is an integer from 2 to 4 inclusive, R is selected from the group consisting of methyl, hydrogen and OR' radicals where R' is an alkyl radical of 1 to 3 inclusive carbon atoms and when present R'' is selected from the group consisting of phenyl and hydrogen, at least one R'' is a phenyl radical, and no more than 1 R'' radical per molecule being hydrogen.

3. The compound tetrakis(trimethylsilyl)methane.
4. The compound tetrakis(dimethylsilyl)methane.
5. The compound tetrakis(dimethylmethoxysilyl)methane.
6. The compound tetrakis(dimethylethoxysilyl)methane.

References Cited by the Examiner
UNITED STATES PATENTS 2,626,266  1/1953  Barry _____ 260—448.2

OTHER REFERENCES

Andreev: "Izvestia Akad. Nauk, SSSR," 1960, pp. 237–43.

Fritz et al.: "Zeitschrift fuer Anorganische and Allgemeine Chemie," volume 309, 1961, pages 77–97.

Muller et al.: "Berichte der Deutschen Chemischen Gesellschaft," volume 91, 1958, pages 22–7.

Petrov et al.: "Doklady Akad. Nauk. SSSR," vol. 107, 1956, pp. 99–102.

Sommer et al.: "Jour. Amer. Chem. Soc.," vol. 77, 1955, pp. 2482–5.

Topchiev et al.: Ibid, volume 109, 1956, pp. 332–5.

TOBIAS E. LEVOW, *Primary Examiner.*

SAMUEL H. BLECH, *Examiner.*

HELEN M. McCARTHY, P. F. SHAVER,
*Assistant Examiners.*